United States Patent
Knauerhase et al.

(10) Patent No.: US 7,962,545 B2
(45) Date of Patent: Jun. 14, 2011

(54) DYNAMIC SERVICE REGISTRY FOR VIRTUAL MACHINES

(75) Inventors: Robert C. Knauerhase, Portland, OR (US); Scott H. Robinson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1865 days.

(21) Appl. No.: 10/393,810

(22) Filed: Mar. 21, 2003

(65) Prior Publication Data

US 2004/0128670 A1    Jul. 1, 2004

Related U.S. Application Data

(63) Continuation-in-part of application No. 10/330,597, filed on Dec. 27, 2002.

(51) Int. Cl.
G06F 15/16 (2006.01)
(52) U.S. Cl. .................... 709/203; 709/224; 718/100
(58) Field of Classification Search .............. 709/203, 709/218, 223, 224, 200–202; 707/10, 101; 718/1, 100; 719/327
See application file for complete search history.

(56) References Cited

U.S. PATENT DOCUMENTS

| | | | |
|---|---|---|---|
| 6,728,746 B1 * | 4/2004 | Murase et al. .................... 718/1 |
| 7,127,526 B1 * | 10/2006 | Duncan et al. ................ 709/249 |
| 7,213,246 B1 * | 5/2007 | van Rietschote et al. ......... 718/1 |
| 7,401,131 B2 * | 7/2008 | Robertson et al. ............ 709/220 |
| 2002/0198734 A1 * | 12/2002 | Greene et al. .................... 705/1 |
| 2003/0033443 A1 * | 2/2003 | Igotti ............................ 709/328 |
| 2005/0172156 A1 * | 8/2005 | Gbadegesin et al. .......... 713/201 |

OTHER PUBLICATIONS

R.J. Creasy, "The Origin of the VM/370 Time-Sharing System," IBM J. Res. Develop., vol. 25, No. 5, Sep. 1981, pp. 483-490.
Ian Foster et al., "Grid Services for Distributed System Integration," IEEE, Jun. 2002, pp. 37-46.
Robert P. Goldberg, "A Survey of Virtual Machine Research," Computer, vol. 7, No. 6, Jun. 1974, pp. 1, 34-45.
Li Gong, "JXTA: A Network Programming Environment," IEEE Internet Computing, May/Jun. 2001, pp. 88-95.
Steve Graham, "The Role of Private UDDI Nodes in Web Services, Part I: Six Species of UDDI," IBM: developerWorks: Web services: Web services articles, May 9, 2001, pp. 1-5, http://www-106.ibm.com/developerworks/library/ws-rpu1.html.

(Continued)

*Primary Examiner* — Moustafa M Meky
(74) *Attorney, Agent, or Firm* — Schwabe, Williamson & Wyatt, P.C.

(57) ABSTRACT

A traditional registry, such as a global UDDI server, is not designed to accommodate transitory devices, e.g., devices that may frequently attach and detach from a network, oftentimes without warning, such as virtual machines offering or desiring services that are periodically instantiated and then suspended or destroyed. To accommodate such transitory devices, a dynamic resource/service registry may be implemented that leverages lower-level protocols or state to determine appropriate registry updates to keep the registry state consistent with currently-active virtual machines. For example, a virtual machine monitor (VMM) may track creation and suspension or deletion of a virtual machine (VM), and resources advertised by the VM, where the VMM appropriately adds or removes registry entries for the VM as the state of the VM changes or provides hooks (e.g. notifications) or other instrumentation based on said state or protocols to enable other associated modules or agents (e.g. management modules or the registry) to take appropriate actions.

14 Claims, 6 Drawing Sheets

OTHER PUBLICATIONS

Steve Graham, "The Role of Private UDDI Nodes, Part 2: Private Nodes and Operator Nodes," IBM: developerWorks: Web services: Web services articles, May 15, 2001, pp. 1-5, http://www-106.ibm.com/developerworks/library/ws-rpu2.html.

Tim Kindberg et al., "System Software for Ubiquitous Computing," IEEE, Pervasive Computing, Jan.-Mar. 2002, pp. 70-81.

Golden G. Richard III, "Service Advertisement and Discovery: Enabling Universal Device Cooperation," IEEE, Sep.-Oct. 2000, pp. 18-26.

Jeremy Sugerman et al., "Virtualizing I/O Devices on VMware Workstation's Hosted Virtual Machine Monitor," Proceedings of the 2001 USENIX Annual Technical Conference, USENIX Association, Jun. 25-30, 2001, pp. 1-15, Boston, Massachusetts, USA.

Steve Vinoski, "Where is Middleware?," IEEE Internet Computing, Mar./Apr. 2002, pp. 83-85.

Carl A. Waldspurger, "Memory Resource Management in VMware ESX Server," Proceedings of the 5th Symposium on Operating Systems Design and Implementation, USENIX Association, Dec. 9-11, 2002, pp. 1-15, Boston, Massachusetts, USA.

Andrew Whitaker et al., "Denali: Lightweight Virtual Machines for Distributed and Networked Applications," University of Washington Technical Report, Feb. 2, 2001, pp. 1-14, Washington, USA.

"UDDI Technical White Paper," uddi.org: Universal Description, Discovery and Integration, Sep. 6, 2000, pp. 1-12, http://www.uddi.org/pubs/Iru_UDDI_Technical_White_Paper.pdf.

"The Technology of Virtual PC: A Connectix White Paper," 2000, pp. 1-12, Connectix Corporation, San Mateo, California, USA.

"The Technology of Virtual Machines: A Connectix White Paper," 2001, pp. 1-13, San Mateo, California, USA.

Waldspurger, Carl A., Memory Resource Management in VMware ESX Server. In Proc. Fifth Symposium on Operating Systems Design and Implementation (OSDI '02), Dec. 2002, pp. 1-14, VMware, Inc., Palo Alto, CA.

\* cited by examiner

DYNAMIC SERVICE REGISTRY FOR VIRTUAL MACHINES

RELATED APPLICATIONS

This application is a continuation-in-part of co-pending application Ser. No. 10/330,597, filed on Dec. 27, 2002, entitled "DYNAMIC SERVICE REGISTRY," and which is commonly assigned to the assignee of the present invention.

FIELD OF THE INVENTION

The invention generally relates to service registries, and more particularly to providing a dynamic service registry responsive to the creation and suspension or deletion of virtual machines (VM) offering or desiring services advertised in a registry.

BACKGROUND

A network, which may include wired and/or wireless intranets, the Internet, wide area networks (WANs), local area networks (LANs), etc., may have many attached devices offering and/or seeking services, capabilities and/or resources of other devices. It is often difficult to locate devices offering particular services. To facilitate locating and tracking devices and their services, various "web service" or "directory service" technologies have been implemented.

The term "web service" describes a standardized way of describing, discovering, and integrating network applications, services and resources from different businesses using open standards, such as World Wide Web Consortium (W3C) and Internet Engineering Task Force (IETF) standards, including XML (Extensible Markup Language), SOAP (Simple Object Access Protocol), WSDL (Web Services Description Language), UDDI (Universal Description, Discovery and Integration), etc., over a network. Web services are self-contained modular applications that may communicate directly with other web services, applications, or system software.

UDDI is an industry initiative utilizing a platform-independent open framework for a global set of registries allowing businesses to define their services, discover other businesses and services, and to share information about how the business interacts. Unfortunately, while UDDI's global nature provides a single source for locating offered services, UDDI lacks the ability to automatically identify and remove stale entries. UDDI allows a device to easily register itself and advertise offered or desired services, capabilities and resources, but UDDI expects the device to behave well and remove its data from the database when the services are no longer offered. Unfortunately, if a device suddenly becomes unavailable, stale registry entries may remain associated with the device.

Consequently, a traditional registry environment is not suitable for transitory devices, such as virtual machines (VMs) which may be arbitrarily created and suspended or destroyed, since suspension or destruction is equivalent to a device suddenly dropping off a network without properly attending to its registration.

BRIEF DESCRIPTION OF THE DRAWINGS

The features and advantages of the present invention will become apparent from the following detailed description of the present invention in which.

DETAILED DESCRIPTION

Figure 1:
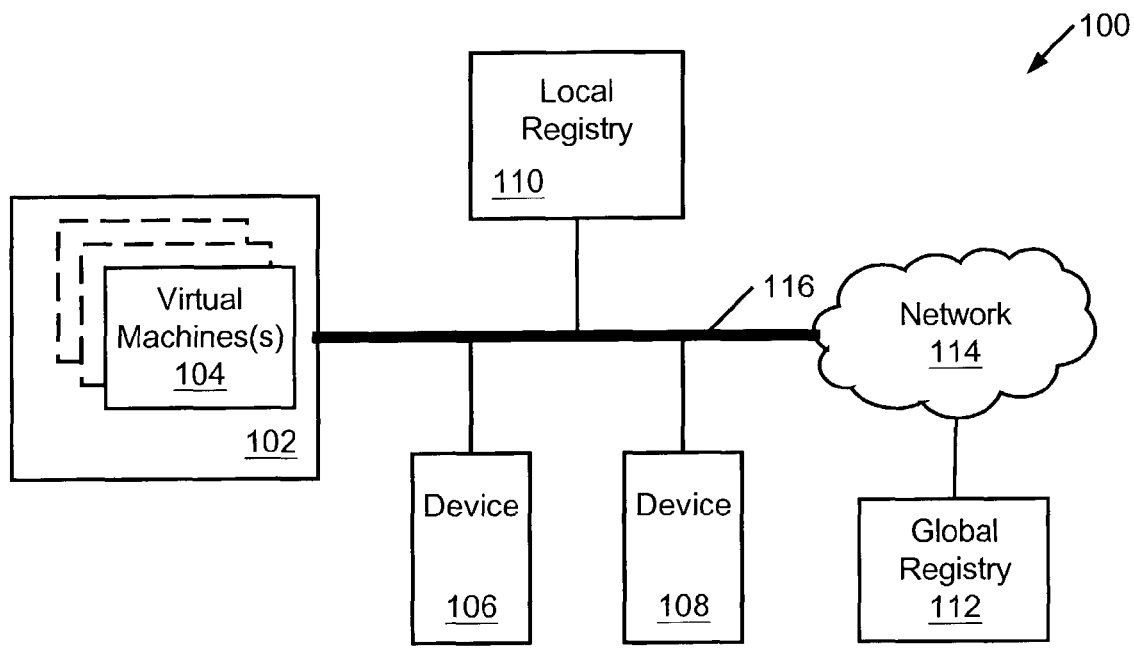
FIG. 1 illustrates an exemplary system supporting integration of VMs into a conventional registry environment while allowing for the VM to be arbitrarily suspended or destroyed without advance warning.

A registry facilitates advertising, discovering, and providing/using services and resources (collectively referenced hereafter as a "registration"). Since resources may be encapsulated and advertised and used as services, unless indicated otherwise directly or by context, the term "services" is intended to include "resources". In the illustrated embodiments, there may be many registries on a network, where some registries are kept fully in sync (i.e. coherent) with other registries, while other registries may elect to keep some registrations private. The invention may be utilized with various directory services, web services, UDDI registries, Microsoft Corporation's NET services, and the like. In the claims, the term "registry" is intended to generally reference these various registries possibilities and equivalents thereto. However, for expository convenience, the following detailed description focuses on UDDI registries. It will be appreciated by one skilled in the art, that as times change, alternate registries or services will arise, and that the teachings herein are applicable thereto.

In a network environment, for various reasons, devices may suddenly appear, disappear, and reappear on the network. Such devices are referenced herein and the claims that follow as "transitory devices." The phrase "transitory device" is intended to broadly encompass both physically distinct machines, such as conventional mobile devices including portable computers, personal digital assistants (PDAs), as well as a logical or virtual device, such as a hardware processor emulation, software machine emulation, or virtual machine (VM). The following description focuses on the interaction between virtual machines (VMs) and registries, such as a UDDI registry. It will be appreciated by one skilled in the art that the following description applies to other transitory devices and registry environments.

A VM may be an emulated machine or emulated platform in hardware, e.g., as a mode of operation of a processor, or in software, such as in a runtime environment. The VM may include the instruction set and other platform resources and/or devices. VM's may be serialized (e.g. state checkpoint) to a shared file system or shipped over the network to be migrated to, de-serialized (e.g. state restore from checkpoint) on and hosted by a different machine. A single physical device may have (i.e. host) multiple VMs. VMs may also utilize a virtual network in addition to, or in lieu of, a physical network connection. A VM may appear or reappear on the network because its VMM (Virtual Machine Monitor or Virtual Machine Manager) has instantiated or resumed the VM. The VM may disappear from the network if the VMM shuts it down, de-instantiates (suspends) it, or otherwise makes it unavailable. Suspending, destroying or otherwise making a VM unavailable is common to allow other VMs to execute, e.g., to access a host's processor, memory, storage, etc., or when the VM no longer has utility (e.g. it has finished processing, or the service it provides is no longer needed.).

It will be appreciated that VMs may communicate with other VMs within the same physical device, with VMs on other physical devices, or simply with other physical devices. In one embodiment, multiple VMs hosted on a particular physical device may communicate among themselves on a private, virtual (optimized) network. In this latter case, the virtualization software (often the VMM or the host operating system, depending on implementation) may operate in a different manner, e.g. allowing inter-VM communication more efficiently through a virtual local network not externally visible outside of the hosting device.

FIG. 1 illustrates an exemplary system 100 supporting integration of VMs into a registry environment, such as UDDI, while allowing for the VM to be arbitrarily suspended, destroyed, or otherwise made unavailable without advance warning. Shown are a device 102 hosting one or more VMs 104, along with conventional, networkable devices 106-108, such as servers, workstations, mobile devices, PDAs, etc., and a local registry 110. These devices 102, 106-110 are communicatively coupled with a global registry 112, such as the Microsoft Corporation UDDI server, by way of a network 114. Note that although the local registry is shown separately from other network devices, it may be incorporated into one of the network devices, whether physical or virtual, see e.g., FIG. 2 device 200.

It will be further appreciated that, in addition to the local 110 and global 112 registries, there may be many other registries (not illustrated) distributed across public and private networks, each storing service registration data for local and/or remote devices. The multiple registries may be kept in sync so that one may register with one registry and later retrieve registration data from another registry. Alternatively, some registries, such as the local registry 110, may elect to keep some or all of their registrations private from other registries such as the global registry 112. For example, assuming communication path 116 is a private local network, such as an intranet, not generally accessible by the network 114, if it is known that devices on the local network are primarily transitory devices, it may be helpful to limit registrations of such devices to the local registry 110 so as to not unnecessarily propagate transitory registrations to the global registry 112. Often private networks will host private services that should not be advertised to or accessed by entities outside of that network domain. Such is the case for many corporate enterprises and small office, home office network configurations.

In one embodiment one or more registries may federate to operate as a single logical registry. In such a case, some registry entries may be duplicated, such as for efficiency purposes, while others only reside in a single registry. For example, duplicated entries might correspond to frequently used services that persist on the network. Transient or infrequently used services might only reside in specific registries.

Figure 2:
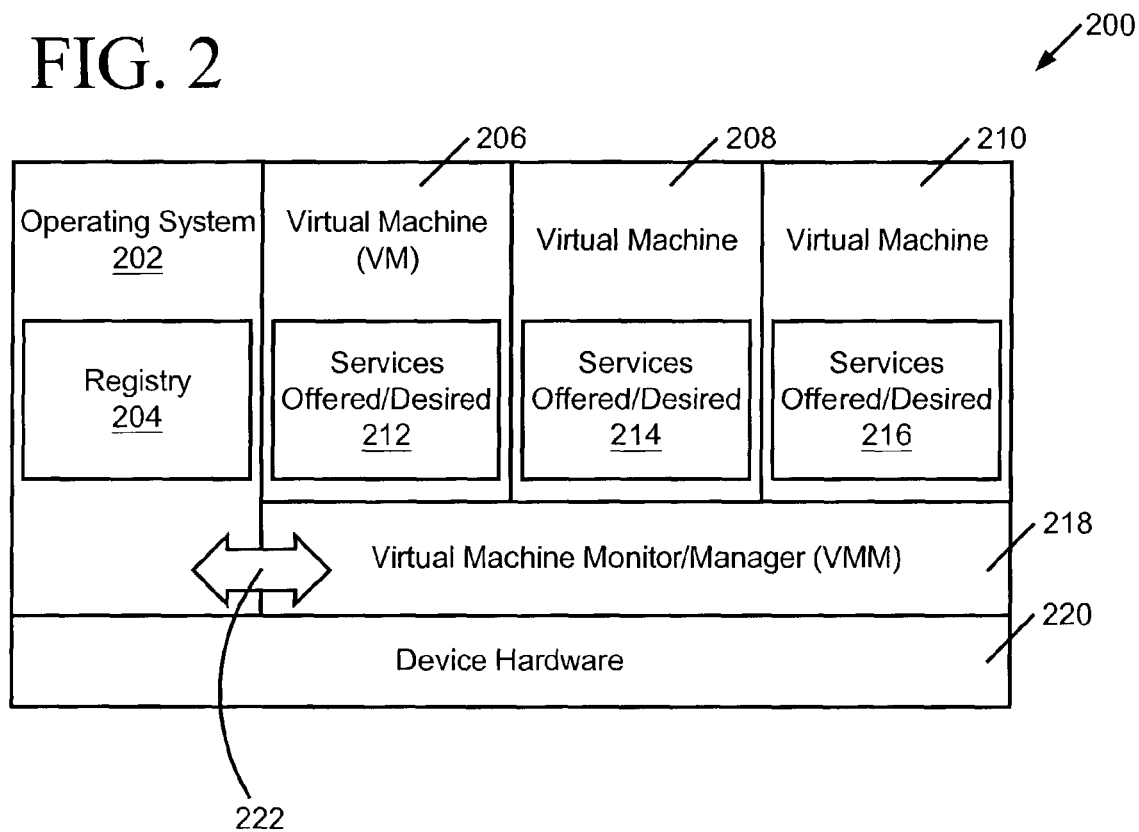
FIG. 2 illustrates an exemplary embodiment of the device 102 of FIG. 1.

FIG. 2 illustrates an exemplary embodiment 200 of device 102 of FIG. 1. As illustrated, the device has an operating system 202, and the device may include a dynamically Updatable registry 204 for storing registrations of offered and/or desired services of virtual machines (VMs) 206-210 of the device. VMs may be implemented in hardware, software, or some combination of the two. The VMs may appear to other network devices to be a physical device on the network. As with conventional VM environments, the VMs operate in conjunction with a VMM 218 (Virtual Machine Manager or Monitor) having hooks 222 into the host device 102 hardware and operating system 202. For example, the VMM may make use of some host operating system services. Each VM may also have an operating system (not illustrated).

As used herein and the claims that follow, the term "hook" or "hooks" refers to mechanisms such as passive or active interfaces (e.g. polled API's, memory locations, or subroutine call-backs), notifications, messages, interrupts, and their associated handlers etc. Each of these provides different tradeoffs which are important to overall system design, but may be incorporated by one skilled in the art. For example, when a VMM destroys a VM, it may notify the registry agent to remove or mark as unavailable all service entries associated with that VM. Often this might be the IP address or hostname of the VM.

As with a conventional device, illustrated VMs 206-210 may include a software server or other hardware or software component offering services, such as web services, and the VM may also have services desired by itself or other VMs. These offered and/or desired services are collectively identified as services 212-216. These services may be conventionally registered, e.g., in accord with the UDDI protocol, with the internal registry 204 or other registry, e.g., FIG. 1 items 110, 112. In one embodiment, a VM may host its own registry. The servers in the VMs may provide multiple instances of the same service (e.g. if the host is a server using VM technology to "slice" performance in some manner) or different services (e.g. if the host offers VM environments to different users who each implement the services they desire). There may also be a set of web services provided by the host 102 itself.

It will be appreciated that the host 102, as well as the VMs 206-210, may wish to advertise, discover, and provide and/or use services and resources. The dynamically updated registry 204 aggregates registrations and serves as a matchmaker between service/resource producers and consumers. Although the host operating system is illustrated as hosting the registry, in one embodiment, a VM hosts the registry outside of but in communication with the host's operating system, thus insulating the host operating system from possible instability of the registry. The registry may be maintained outside of the device, e.g. through use of the FIG. 1 local registry 110. Desired services may be satisfied through identifying registrations in the internal 204, the local registry, or a global registry 112. Since VM's are excellent isolation containers, some complex applications may be partitioned across multiple VM's, each cooperatively tasking on a project as would distinct machines. It will be appreciated that the internal 204 or local 110 registries may be configured to offer various benefits, such as failure detection, failover, load balancing, etc., and therefore the registry may provide such services across the VMs.

As is understood in the art, the VMs operate in conjunction with a VMM 218. The VMM operates above device hardware 220 and regulates/arbitrates access by the VMs to the physical device hardware. In the illustrated embodiment, the VMM also regulates VM access to host operating system 202 resources. The VMM may be configured to allow complete isolation of VMs 206-210, or to allow data sharing between some or all of the VMs according to desired security policies. It will be appreciated that the VMM may be implemented in various ways, including in software, hardware, or a combination thereof on a host. For example, the VMM may be implemented as an application and device drivers, etc. (e.g. VMWare by VMware, Inc. of California), as part of the operating system 202, or as part of a chipset or a microprocessor.

Figure 5:
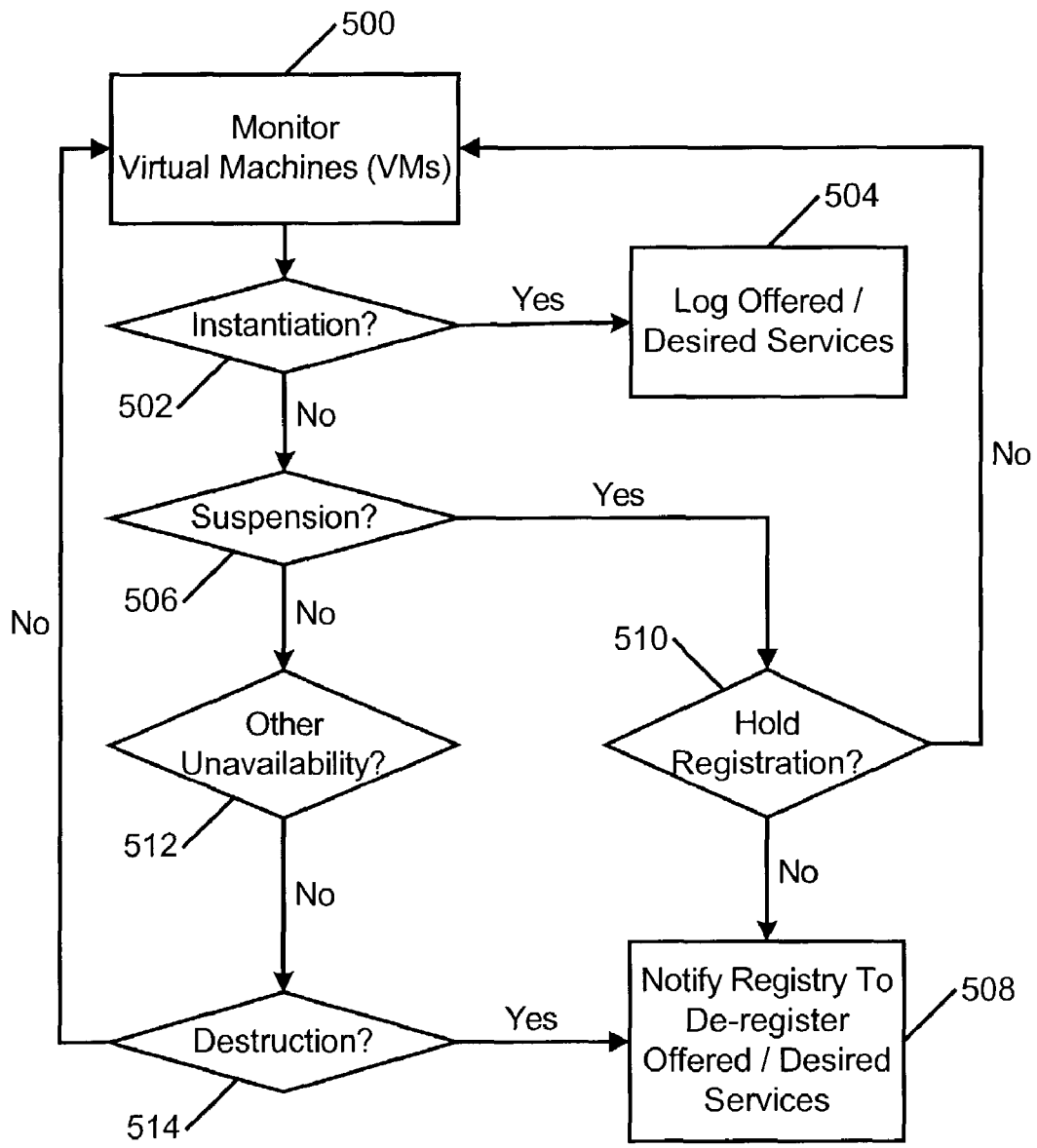
FIG. 5 illustrates an exemplary flowchart for automatically registering and deregistering VM services based on the status of a VM.

In contrast with a conventional VMM, in the illustrated embodiment the VMM 218 is configured to monitor the state of VMs and to automatically issue notifications to a registry to cause the registration and de-registration of VM services 212-216 based on monitored state (see, e.g., FIG. 5). The internal registry 204, or local registry 110, is made dynamic through monitoring of VMM state about VMs or VMM-to-VM protocols (e.g. VM state transitions) to determine appropriate registry updates. In one embodiment, the VMM 218 monitors at least VM creation, destruction, suspension requests, as well as registry advertising/de-registration requests, e.g., UDDI requests, to identify VMs having registry registrations affected by a change in VM status. In one embodiment, operating system hooks 222 are used to monitor operating system calls relating to advertising/de-registration requests and to implement registry registration changes. The operating system 202 and registry 204 are presumed responsive to notification by the VMM to register or de-register services. In a further embodiment (not illustrated), a VM may itself host other VMs (sub-VMs) advertising services and/or resources offered by or desired by the sub-VMs. Such embodiments can include arbitrary depths of VM recursion.

By providing for automatic handling of registrations based on VM status changes, one may, for example, facilitate VM migration, where a VM and its contents are serialized to a file system or the network and then re-instantiated on another physical host, possibly at a different physical host or remote location. On suspension, a VM's registrations are automatically de-registered, and when resumed, the registrations may be automatically re-registered.

Figure 3:
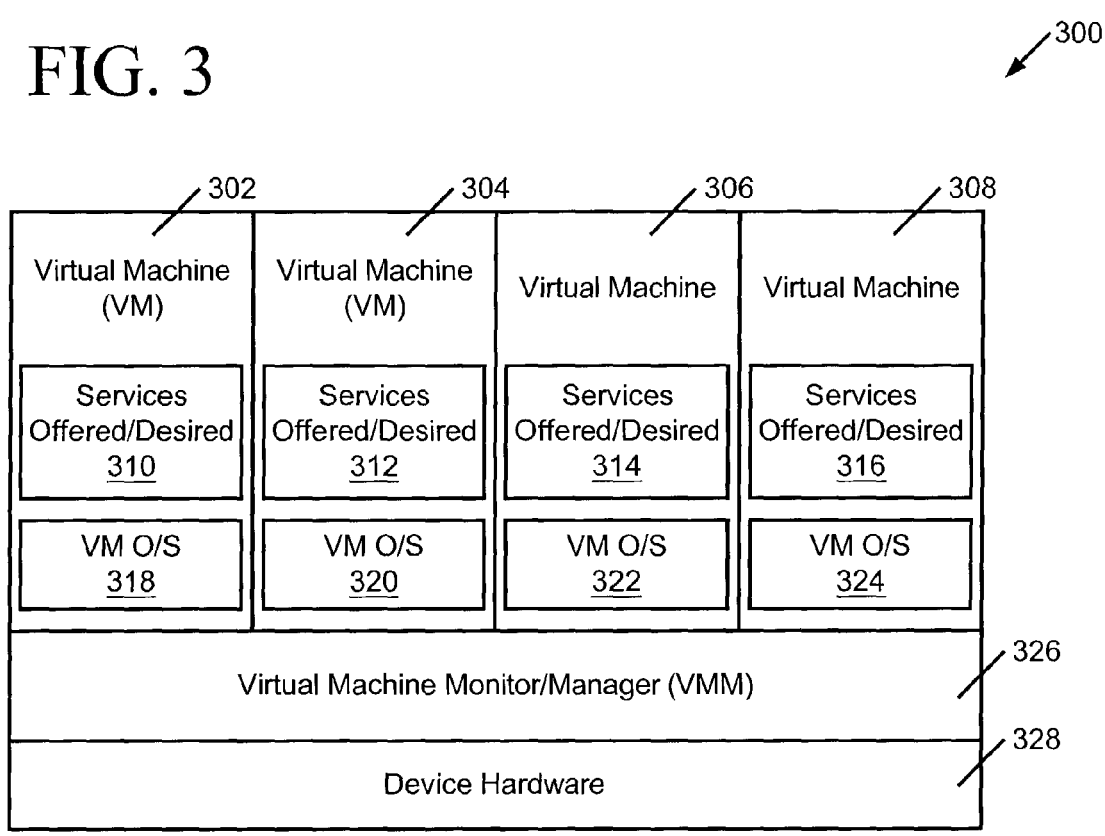
FIG. 3 illustrates another embodiment of the device 102 of FIG. 1.
Figure 4:
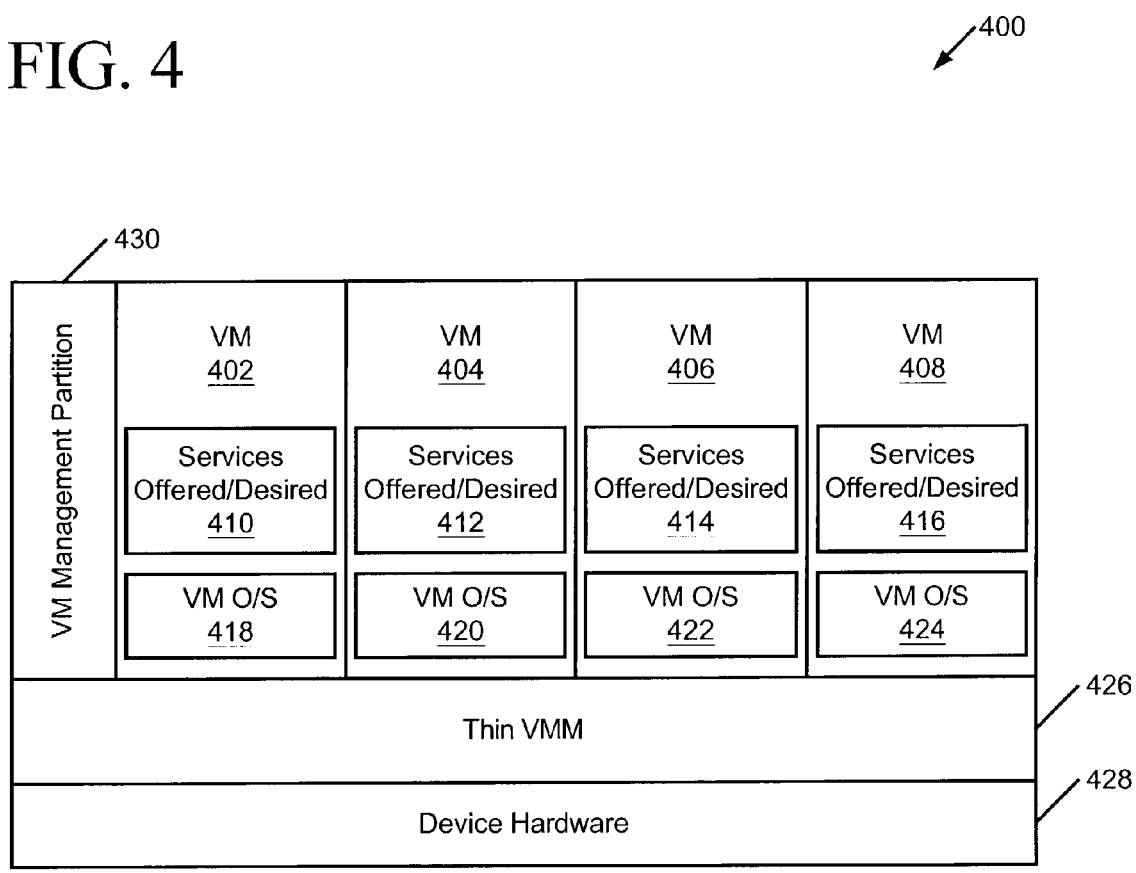
FIG. 4 illustrates another embodiment of the device 102 of FIG. 1.

While FIG. 2 assumes the VMs utilize resources of a host operating system 202, FIGS. 3, 4, 5 illustrate alternate exemplary embodiments.

FIG. 3 illustrates a VM/VMM embodiment 300 where the host does not have a particular operating system, but instead each VM 302-308 has services 310-316 desired or offered by the VM and their own operating system 318-324. The operating systems may each be the same, similar to, or different from each other. In this embodiment, the VMM operates on top of a host device's hardware 328, and the VMM manages each VM and its operating system's access to the host device's hardware.

In this embodiment, hooks between the VMM 326 and various VM operating systems 318-324 (or service modules 310-316) allow the VMM to monitor registrations of the VMs 302-308 offered and/or desired services 310-316. A dynamic registry may be implemented, for example as discussed above with respect to FIG. 2, based on the monitoring.

FIG. 4 illustrates another embodiment 400 where, as with FIG. 3, the host does not have a particular operating system, but instead there are separate VMs 402-408, each VM having services 410-416 desired or offered by the VM, and each VM having their own operating system 418-424.

In this embodiment, there is a "thin" VMM 426 operating on top of a host device's hardware 428 which manages VM access to the hardware. It may be desirable to have a thin VMM for efficiency and reliability and verifiability. A management partition 430, possibly residing in a VM, operating system hosted driver, or associated management hardware (e.g., plug-in board, computer, processor, etc.), has special relations, permissions, or interfaces with the VMM. The management partition obtains information about the state of the VMs from the VMM, and takes appropriate action to notify the registry. It is assumed the management partitions, in conjunction with the VMM, have the power to start, stop, and provision the VMM.

The simpler the VMM, the less likely its implementation will have errors resulting in hard-to-identify problems which may intermittently occur across multiple VMs. Thus the VMM may offload or enhance certain operations through the management partition 430. The management partition might, for instance, implement more complex policies. Thus, the VMM might provide a management partition with the information needed to make service registry updates, where the base mechanisms (e.g., detectors, triggers, etc.) are in the VMM, and the code for taking action is in the management partition. An additional benefit of a simple VMM is ability to more easily implement the VMM in hardware as it is less likely to require frequent updating.

As with FIG. 3, in this embodiment, hooks between the Management Partition 430 and various VM operating systems 418-424 allow the Management Partition, in conjunction with the thin VMM 426, to monitor registrations of the VMs 402-408 offered and/or desired services 410-416. A dynamic registry may be implemented, for example as discussed above with respect to FIG. 2, based on the monitoring.

FIG. 5 illustrates an exemplary flowchart of operations performed by a VMM operating according to the FIG. 2 embodiment. It will be appreciated the flowchart may be applied to the other disclosed embodiments.

In one embodiment, the VMM monitors 500 for events relating to the state of the VMs. The VMM directly controls the global execution state of a given VM and that VM's access to a devices physical and virtual (e.g. emulated) resources and services. It will be appreciated that the monitoring may be augmented or performed by a component of a host or VM operating system, or elsewhere. In this illustrated embodiment, the VMM is monitoring for instantiation 502, destruction 514, suspension 506, or other 512 events indicating a change in the operational state of a VM. For example, if 502 the VMM instantiates a VM, the VMM logs 504 any services offered and/or desired by the VM. That is, when the VM is instantiated, it may start a web-services server, and then register offered and/or desired services with a registry, such as internal registry 204 of FIG. 2. Logged 504 services are used to properly de-register services from the registry when the VMM detects unavailability of a VM.

For example, in a UDDI context, publish requests may be monitored and logged. Monitoring may entail transparently watching for network traffic, identifying UDDI publish requests. A VMM has observability and controllability of physical networking as well as any virtual, on-device networks used by the VMs as it marshals access to these network resources. Alternatively, a web services or other server may be configured to directly notify the monitor, e.g., the VMM, or middleware (e.g. NET or Java classes) may be configured to notify the monitor when the middleware is invoked to publish service availability, or the monitor could periodically poll the registry for services provided by known VMs, or the monitor could not track publish requests, but instead blindly, on de-activation (suspension or destruction) of a VM, tell a registry to delete "all services published by that VM."

Thus, if 506, 512 the VMM detects a suspension event, or some other event rendering a VM unavailable, such as the VM going to sleep, being swapped out, etc., this may result in the VMM notifying 508 the registry to delete the services provided by that VM, thus keeping the set of services listed in the registry current and never stale. In one embodiment, before de-registering a VM, the VMM may be configured to first check 510 whether the VM registration is flagged to be held. That is, it may be desirable to allow some registrations for transitory devices to survive in a registry even though the VM appears unavailable. For example, a VM may be held in a suspended state until its services are requested. A VM in a suspended state may reside in memory or it may have been stored to non-volatile storage, such as FIG. 6 storage 608. In such a case, it is desirable to maintain its registration(s) unless, for example, the VM is being destroyed.

If 514 the VMM detects a destruction event, it is assumed in the illustrated embodiment that registrations associated with the destroyed VM are now invalid. The VMM therefore notifies 508 the registry to de-register the VM's services. However, it will be appreciated that similar to a hold registration status, a status may be associated with VM registrations so that the registrations of a destroyed VM are to be retained. If 510 registration is not being held or if 514 a destruction event has not been detected, then processing may continue with monitoring 500 the virtual machines.

Note that while the foregoing has assumed the VMM is configured to direct a registry to de-register services for VMs, whether the registry is internal to a device or a local registry such as local registry 110 of FIG. 1, the monitoring may be performed by the registry itself or an operating system component working with the VMM, rather than strictly by the VMM alone. For example, rather than the VMM notifying the registry, instead a local registry can monitor/communicate with the VMM (or an agent of the VMM, such as a management module) and update itself accordingly. For an internal registry, such as registry 204, the hooks 222 may be used by the registry 204 to monitor and/or query the VMM to track VM status. For an external registry, such as local registry 110, in one embodiment, there may be software on the host device (or virtual machines) to monitor publish/delete messages issued by VMs, and to interact with the VMM to determine operational state of the VMs, where the software notifies the registry to update itself accordingly.

Figure 6:
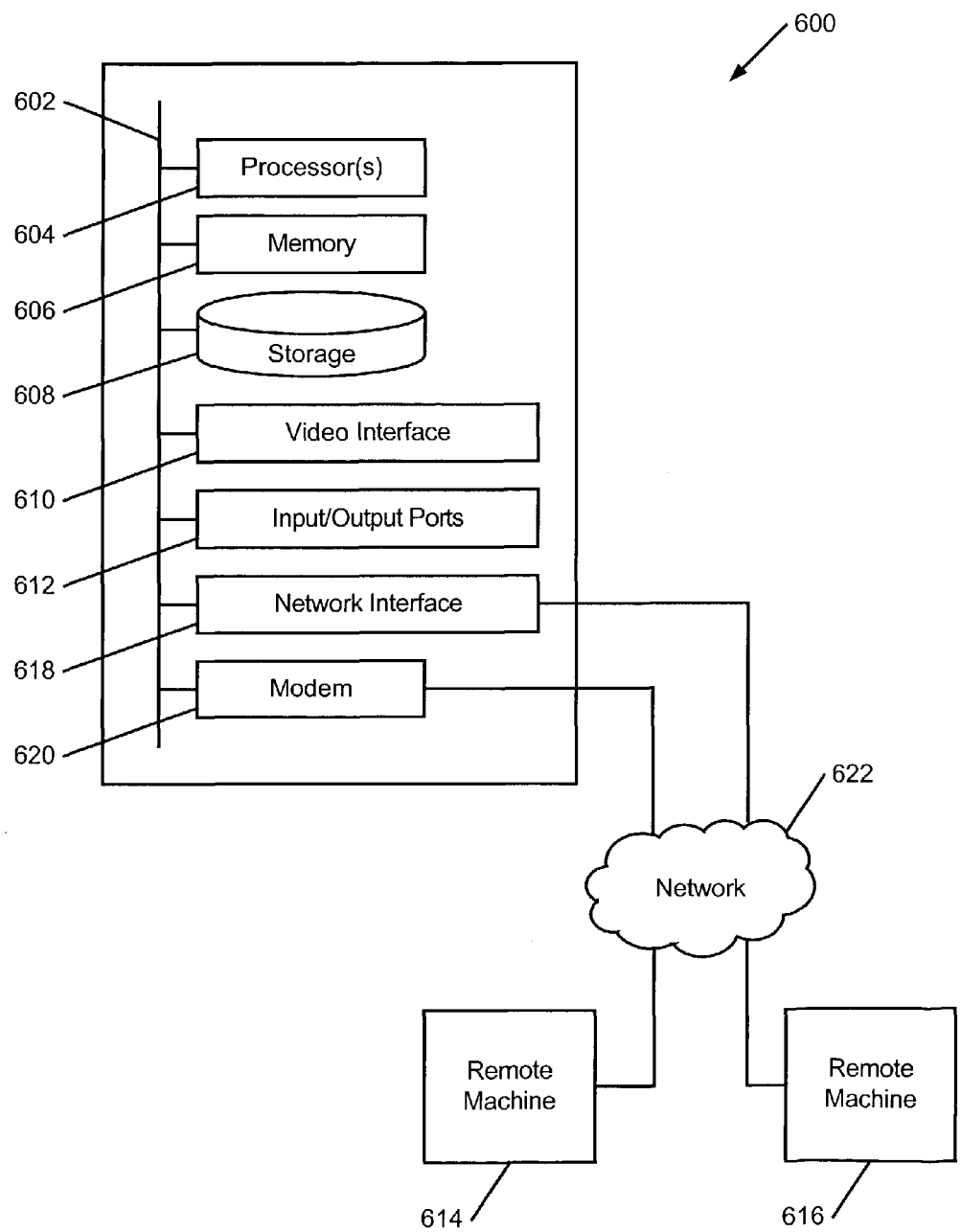
FIG. 6 illustrates a suitable computing environment in which certain aspects of the invention may be implemented.

FIG. 6 and the following discussion are intended to provide a brief, general description of a suitable environment in which certain aspects of the illustrated invention may be implemented.

As used herein below, the phrase "host machine" is intended to broadly encompass a single machine, or a system of communicatively coupled machines or devices operating together. Exemplary host machines include FIG. 1 physical devices 102, 106-110, as well as personal computers, workstations, servers, etc. The host machine hardware is accessible by virtual machines 104, 206-210, 302-308, 402-408, in accord with the operations and policies of a VMM and/or VM Management Module.

Typically, a host machine 600 includes a system bus 602 to which is attached processors 604, a memory 606, e.g., random access memory (RAM), read-only memory (ROM), or other state preserving medium, storage devices 608, a video interface 610, and input/output interface ports 612. The host machine and/or its virtual machines may be controlled, at least in part, by input from conventional input devices, such as keyboards, mice, etc., as well as by directives received from another machine, interaction with a virtual reality (VR) environment, biometric feedback, or other input source or signal.

The host machine may include embedded controllers, such as programmable or non-programmable logic devices or arrays, Application Specific Integrated Circuits, embedded computers, smart cards, and the like. The host machine and/or its virtual machines may utilize one or more connections to one or more remote machines 614, 616, such as through a network interface 618, modem 620, or other communicative coupling. The host machine and/or its virtual machines may be interconnected by way of a physical and/or logical network 622, such as the FIG. 1 network 114, which may include an intranet, the Internet, local area networks, wide area networks, etc. One skilled in the art will appreciated that communication with network 622 may utilize various wired and/or or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by the host machine 600 and/or its virtual machines results in the host machine and/or its virtual machines performing tasks or defining abstract data types or low-level hardware contexts. Associated data may be stored in, for example, volatile and/or non-volatile memory 606, or in storage devices 608 and their associated storage media, including hard-drives, floppy-disks, optical storage, tapes, flash memory, memory sticks, digital video disks, biological storage, etc. Associated data may be delivered over transmission environments, including network 622, in the form of packets, serial data, parallel data, propagated signals, etc., and may be used in a compressed or encrypted format. Associated data may be used in a distributed environment, and stored locally and/or remotely for access by single or multi-processor machines.

Thus, for example, with respect to the illustrated embodiments, assuming host machine 600 embodies the FIG. 2 dynamic registry storing registrations for FIG. 2 virtual machines 206-210, then remote machine 614 may be a server, display device, printers, etc. providing resources that may be utilized by the host machine or its virtual machines, while remote machine 616 may be a device seeking services being offered by one of the virtual machines 206-210. It will be appreciated that remote machines 614, 616 may be include many or all of the elements discussed for machine 600 or its virtual machines, and that both transient devices and permanent devices may wish to advertise, discover, and provide/use services and resources of the other. A dynamically updated registry may be used to aggregate and match service and/resource producers with consumers.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for registering a service or resource offered by a virtual machine, the method comprising:
    monitoring, by a registry in cooperation with a virtual machine manager associated with the virtual machine, an event indicating change of operational state of the virtual machine; and
    updating, by the registry, a registration of the service or resource offered by the virtual machine with the registry, in response to the monitored event indicating change of operational state of the virtual machine;

wherein the registry includes registration information of the service or resource offered by the virtual machine, the registry is searchable for the service or resource, and the service or resource is advertised by the virtual machine to one or more other virtual machines through the registry.

2. The method of claim 1, wherein updating the registration of the service or resource offered by the virtual machine further comprising:

registering in the registry, by the registry, the service or resource offered by the virtual machine if the event indicates the operational state of the virtual machine is changed to instantiation; and de-registering in the registry, by the registry, the service or resource offered by the virtual machine if the event indicates the operational state of the virtual machine is changed to destruction.

3. The method of claim 1, further comprising:

determining, by the registry, if the registration of the service or resource offered by the virtual machine should be held in the registry even if the monitored event indicates the virtual machine is unavailable based on whether the service or resource offered by the virtual machine is a transient service or resource;

flagging, by the registry, the registration of the service or resource offered by the virtual machine to be held in the registry based on said determining; and maintaining, by the registry, the flagged registration of the service or resource offered by the virtual machine in the registry if the virtual machine is suspended or swapped out.

4. The method of claim 1, further comprising:

monitoring, by the registry, for a time-to-live associated communication by the virtual machine; and deregistering, by the registry, the service or resource offered by the virtual machine from the registry if the virtual machine fails to communicate within the time-to-live.

5. The method of claim 4, the method further comprising:

resetting the time-to-live, if the registry receives a communication from the virtual machine is within the time-to-live.

6. The method of claim 1, wherein the registry, the virtual machine and the virtual machine manager are disposed in a single device.

7. An apparatus, comprising:

a registry;

a virtual machine configured to offer a service or a resource, wherein the service or resource offered by the virtual machine is registered with the registry and advertised to one or more other machines through the registry; and a virtual machine manager associated with the virtual machine;

wherein the registry is further configured to monitor an event indicating change of operational state of the virtual machine, with assistance from the virtual machine manager, and update the virtual machine's service or resource registration included in the registry in response to a monitored event indicating change of operational state of the virtual machine.

8. The apparatus of claim 7, further comprising a hook between the registry and the virtual machine manager configured to allow the registry to query the virtual machine manager about an operational state of the virtual machine.

9. The apparatus of claim 7, wherein the virtual machine is a first virtual machine, the service or resource offered by the first virtual machine is a first service or resource, the registry of the first virtual machine is a first registry, and the apparatus further comprises a second virtual machine offering a second service or resource, and the second virtual machine has a second registry including registration information of the second service or resource offered by the second virtual machine;

the second registry is further configured to monitor the operational state of the second virtual machine, with the assistance of the virtual machine manager, and automatically update the registration of services or resource offered by the second virtual machine with the second registry.

10. The apparatus of claim 9, wherein each of the first and second virtual machines has an operating system and hooks between the virtual machine manager and the respective operating systems allowing the operating systems to query the virtual machine manager for the respective operational states of the first and second virtual machines.

11. A system, comprising:

a first device hosting a registry; and a second device hosting a virtual machine manager and a virtual machine managed by the virtual machine manager;

wherein the virtual machine is configured to offer a service or resource, and the service or resource offered by the virtual machine is registered with the registry and advertised to one or more other virtual machines through the registry; and wherein the registry is further configured to monitor an event indicating change of operational state of the virtual machine, with assistance from the virtual machine manager, and update a registration of the service or resource included in the registry in response to a monitored event indicating change of operational state of the virtual machine.

12. An article of manufacture comprising:

a tangible non-transitory machine-accessible storage media having a plurality of machine executable instructions, wherein the instructions, in response to execution by an apparatus, result in a registry performing operations including:

monitoring, with assistance from a virtual machine manager associated with a virtual machine, an event indicating change of operational state of the virtual machine, wherein the virtual machine offers a service or resource, and wherein the service or resource offered by the virtual machine is registered with the registry; and updating a registration of the service or resource offered by the virtual machine in response to a monitored event indicating change to the operational state of the virtual machine;

wherein the registry is searchable for the service or resource offered by the virtual machine, and the service and resource offered by the virtual machine is advertised to one or more other virtual machines through the registry.

13. The article of claim 12 wherein the operations further comprise
   registering the service or resource offered by the virtual machine with the registry if the event indicates the operational state of the virtual machine is changed to instantiation; and
   de-registering the virtual machine's service or resource registration with the registry if the event indicates the operational state of the virtual machine is changed to destruction.

14. The article of claim 12 wherein the instructions further result in the registry performing operations comprising:
   monitoring for time-to-live related communication by the virtual machine; and
   automatically de-registering by the registry the virtual machine's registration from the registry if the virtual machine fails to communicate within the time-to-live.

* * * * *